US006217993B1

United States Patent
Pause

(12) United States Patent
(10) Patent No.: US 6,217,993 B1
(45) Date of Patent: *Apr. 17, 2001

(54) INTERACTIVE THERMAL INSULATING SYSTEM HAVING A LAYER TREATED WITH A COATING OF ENERGY ABSORBING PHASE CHANGE MATERIAL ADJACENT A LAYER OF FIBERS CONTAINING ENERGY ABSORBING PHASE CHANGE MATERIAL

(75) Inventor: Barbara Pause, Longmont, CO (US)

(73) Assignee: Outlast Technologies, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/330,807

(22) Filed: Jun. 11, 1999

Related U.S. Application Data

(63) Continuation of application No. 08/970,555, filed on Nov. 14, 1997, now Pat. No. 6,077,597.

(51) Int. Cl.[7] ..................................................... B32B 7/02
(52) U.S. Cl. ........................... 428/218; 428/102; 428/402; 442/74; 442/75; 442/85; 442/246; 442/247
(58) Field of Search .................................. 428/218, 102, 428/402; 442/74, 75, 85, 246, 247

(56) References Cited

U.S. PATENT DOCUMENTS

| | | |
|---|---|---|
| 3,852,401 | 12/1974 | Suzuki et al. . |
| 4,003,426 | 1/1977 | Best et al. . |
| 4,006,273 | 2/1977 | Wolinsky et al. . |
| 4,208,485 | 6/1980 | Nahta . |
| 4,446,916 | 5/1984 | Hayes . |
| 4,504,402 | 3/1985 | Chen et al. . |
| 4,531,511 | 7/1985 | Hochberg . |
| 4,572,864 | 2/1986 | Benson et al. . |
| 4,581,285 | 4/1986 | Mahefkey, Jr. . |
| 4,587,579 | 5/1986 | Salyer et al. . |
| 4,612,239 | 9/1986 | Dimanshteyn et al. . |
| 4,645,613 | 2/1987 | Harvey et al. . |
| 4,747,240 | 5/1988 | Voisinet et al. . |
| 4,756,958 | 7/1988 | Bryant et al. . |
| 4,774,133 | 9/1988 | Doree . |
| 4,825,939 | 5/1989 | Salyer et al. . |
| 4,856,294 | 8/1989 | Scaringe et al. . |
| 4,935,294 | 6/1990 | Misevich et al. . |
| 4,939,020 | 7/1990 | Takashima et al. . |
| 5,053,446 | 10/1991 | Salyer . |
| 5,069,358 | 12/1991 | Avery, Jr. . |
| 5,106,520 | 4/1992 | Salyer . |

(List continued on next page.)

OTHER PUBLICATIONS

"Innovative Protection Clothing: PCM Microcapsules as Barrier for Optimized Cold Protection," *Techtextil–Telegramm*, Mar. 28, 1994, pp. 2–3, Frankfurt, Germany.

"Fabrics given enhanced thermal properties," *Chemical & Engineering News*, p. 15, Oct. 20, 1986, Washington, D.C.

*Primary Examiner*—Blaine Copenheaver
(74) *Attorney, Agent, or Firm*—Holland & Hart LLP

(57) ABSTRACT

An interactive thermal insulating system of the present invention includes at least three layers. The first layer is a high density layer comprising a substrate is coated with a polymer binder in which a plurality of microspheres containing a phase change material are dispersed. The second layer is a low density fibrous mesh in which individual fibers contain a plurality of microspheres containing a phase change material dispersed therein. A third layer is a flexible substrate. The fibrous mesh is sandwiched between the coated layer and the third layer. The layers are bonded together by stitching at regular intervals, lamination, or other methods of connection. Most preferably, the phase change materials contained in the microspheres include paraffinic hydrocarbons.

15 Claims, 1 Drawing Sheet

U.S. PATENT DOCUMENTS

| | | |
|---|---|---|
| 5,254,380 | 10/1993 | Salyer . |
| 5,282,994 | 2/1994 | Salyer . |
| 5,290,904 | 3/1994 | Colvin et al. . |
| 5,360,826 | 11/1994 | Egolf et al. . |
| 5,366,801 | 11/1994 | Bryant et al. . |
| 5,415,222 | 5/1995 | Colvin et al. . |
| 5,499,460 | 3/1996 | Bryant et al. . |
| 5,722,482 | 3/1998 | Buckley . |
| 6,077,597 * | 6/2000 | Pause .................................. 428/218 |

* cited by examiner

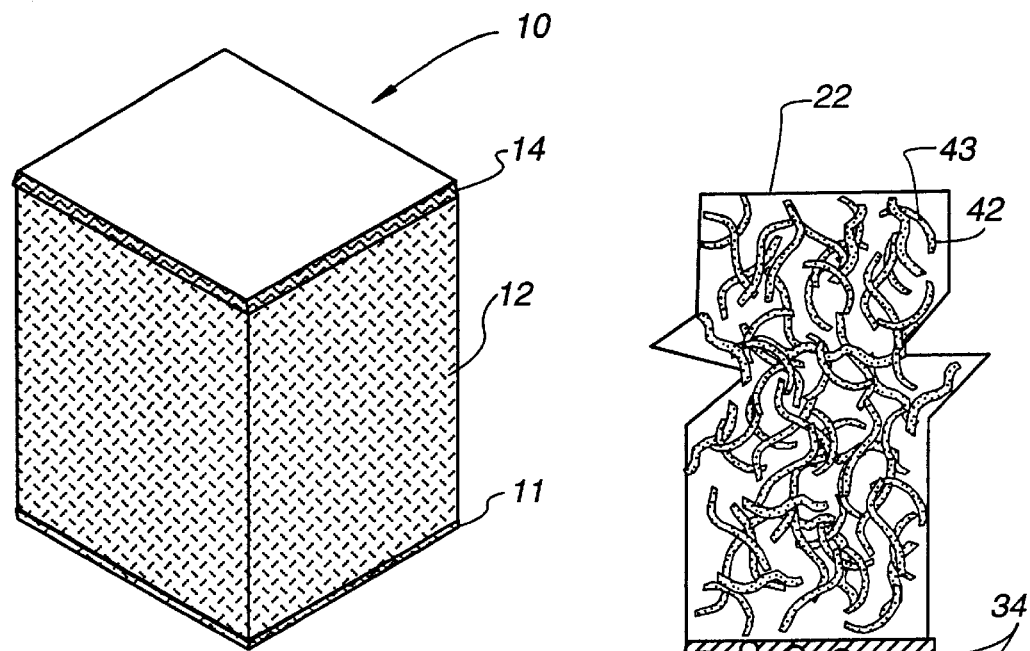
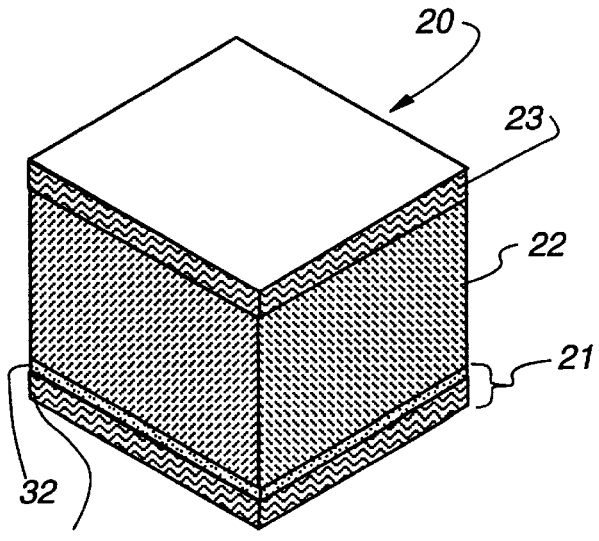
Prior Art
Fig. 1
Fig. 2
Fig. 3
Fig. 4

INTERACTIVE THERMAL INSULATING SYSTEM HAVING A LAYER TREATED WITH A COATING OF ENERGY ABSORBING PHASE CHANGE MATERIAL ADJACENT A LAYER OF FIBERS CONTAINING ENERGY ABSORBING PHASE CHANGE MATERIAL

RELATED APPLICATIONS

The present application is a continuation of U.S. application Ser. No. 08/970,555, filed Nov. 14, 1997, now U.S. Pat. No. 6,077,597 from which priority under 35 U.S.C. § 120 is claimed, which is incorporated herein in its entirety. The present application contains subject matter which is related to the subject matter of U.S. patent application Ser. No. 08/477,824 filed Jun. 7, 1995, pending, and to U.S. patent application Ser. No. 08/259,964 filed Jun. 14, 1994, now abandoned, both of which are entitled FABRIC COATING CONTAINING ENERGY ABSORBING PHASE CHANGE MATERIAL AND METHOD OF MANUFACTURING SAME and are incorporated herein by reference.

FIELD OF THE INVENTION

This invention relates to thermal insulating fabric systems. More particularly, this invention relates to thermal insulating fabric systems containing energy absorbing, temperature stabilizing phase change materials suitable for clothing construction.

BACKGROUND OF THE INVENTION

Cold protective clothing, for example, overalls and jackets, are designed to protect those working or playing in low temperature environments against substantial body heat loss. Referring now to FIG. 1, it can be seen that such garments are constructed from a fabric system 10 which typically includes an outer shell 11, an insulative layer 12 of batting, down, other insulation, and a lining layer 14. With this configuration, the heat loss from the body through the garment layers is slowed by the air spaces of insulative layer 12. Because the thermal insulation of the garment is provided mainly by the batting and is directly related to the volume of air trapped therein, insulative capability of such garments is typically increased by increasing the thickness of the insulative layer.

Clothing utilizing such conventional construction for cold weather applications have some deficiencies, however. For example, increasing the thickness of the insulative layer can make cold weather clothing so bulky as to be impractical to wear when tasks have to be performed by the wearer. Also, conventional cold weather clothing can become uncomfortable when the wearer is involved in alternating periods of inactivity and intense activity. For example, when a person skiing down a ski slope is wearing a conventional winter jacket skis, the person's metabolic heat rate increases substantially. This heat cannot be released as required to maintain comfort, because the insulation layer works against such release. The person tends to overheat and may perspire. The perspiration can wet the liner and the insulative layers. Then, when the person stops skiing, such as when a skier sits in a chair lift and rides to the top of the ski slope, insulative capabilities of the jacket are decreased by the dampness and the skier becomes chilled during the chair lift ride. Fundamentally, the conventional cold weather clothing discussed above has a generally static response, and is unable to response variously to changing wearing conditions.

New materials have been developed in an attempt to address special clothing and other thermal regulating system requirements. For example, microencapsulated phase change materials have been described as a suitable component for substrate coatings when exceptional heat transfer and storage capabilities are desired. In particular, U.S. Pat. No. 5,290,904 for "Fabric with Reversible Enhanced Thermal Properties" to Colvin, et al., incorporated herein by reference teaches that substrates coated with a binder containing microcapsules filled with energy absorbing phase change material enables the substrate to exhibit extended or enhanced heat retention or storage properties. Substrates coated with a binder containing microencapsulated phase change materials are referred to herein as microPCM-coated substrates.

Also by way of example, microencapsulated phase change materials have been described as a suitable component for inclusion in fibers, when exceptional heat transfer and storage capabilities are desired. In particular, U.S. Pat. No. 4,756,958 for "Fiber with Reversible Enhanced Thermal Properties and Fabrics Made Therefrom" to Bryant, et al., also incorporated herein by reference, teaches that a fiber with integral microspheres filled with phase change material or plastic crystals has enhanced thermal properties at predetermined temperatures. This patent further teaches that such fibers may be woven to form a fabric having the enhanced thermal storage properties, and that articles of manufacture may be formed therefrom. Fabrics manufactured from such fibers are referred to herein as microPCM-containing fabrics.

Generally speaking, phase change materials have the capability of absorbing or releasing thermal energy to reduce or eliminate heat transfer at the temperature stabilizing range of the particular temperature stabilizing material. The phase change material inhibits or stop the flow of thermal energy through the coating during the time the phase change material is absorbing or releasing heat, typically during the material's change of phase. This action is transient, i.e., it will be effective as a barrier to thermal energy until the total latent heat of the temperature stabilizing material is absorbed or released during the heating or cooling process. Thermal energy may be stored or removed from the phase change material, and can effectively be recharged by a source of heat or cold. By selecting an appropriate phase change material, a substrate can be coated or a fiber manufactured incorporating a phase change material, for use in a particular application where the stabilization of temperatures is desired.

Exemplary paraffinic hydrocarbon phase change materials suitable for use in the coatings or in fibers are shown in Table I, with the number of carbon atoms in such materials directly related to the respective melting and crystallization points.

TABLE I

| Compound | No. Carbon Atoms | Crystallization Point | Melting Point |
| --- | --- | --- | --- |
| n-Eicosane | 20 | 30.6° C. | 36.1° C. |
| n-Octadecane | 18 | 25.4° C. | 28.2° C. |
| n-Heptadecane | 17 | 21.5° C. | 22.5° C. |
| n-Hexadecane | 16 | 16.2° C. | 18.5° C. |

The patents identified above teach how phase change materials such as the above-listed paraffinic hydrocarbons are preferably formed into microspheres and encapsulated in a single or multi-layer shell of gelatin or other material. Encapsulated microsphere diameters of 1 to 100 microns are preferred, most preferably from 10 to 60 microns. Microspheres may also be bound in a silica matrix of sub-micron diameters.

Newer fabrics incorporating phase change materials as identified above are beginning to be individually incorporated into commercially available clothing. However, a configuration which is especially adapted to provide a superior thermal response in low temperature conditions where variable activity levels or weather conditions occur is not yet available. Thus, there remains a continuing need for materials which can provide a dynamic thermal response.

It is against this background that the significant improvements and advancement of the present invention have taken place in the field of substrates incorporating energy absorbing and releasing temperature stabilizing phase change materials.

OBJECTS OF THE INVENTION

It is the principal object of the present invention to provide a dynamic thermal regulating system which is suitable for use in clothing and adaptable to changing working and wearing conditions.

It is another object of the present invention to provide a dynamic thermal regulating system in which clothing may be comfortably worn for longer wearing times.

It is another object of the present invention to provide a dynamic thermal regulating system adapted for use in cold temperature environments.

Is yet another object of the present invention to provide a dynamic thermal regulating system having the aforementioned qualities and also exhibiting reduced thickness of construction for enhanced freedom of movement of the wearer.

It is a still further object of the present invention to provide a thermal regulating system in a configuration which can be incorporated into clothing using conventional clothing patterns and styles.

SUMMARY OF THE INVENTION

An interactive thermal insulating system of the present invention includes at least three layers. The first layer is a high density layer comprising a substrate is coated with a polymer binder in which a plurality of microspheres containing a phase change material are dispersed. The second layer is a low density fibrous mesh in which individual fibers contain a plurality of microspheres containing a phase change material dispersed therein. A third layer is a flexible substrate. The fibrous mesh is sandwiched between the coated layer and the third layer. The layers are bonded together by stitching at regular intervals, lamination, or other methods of connection. Most preferably, the phase change materials contained in the microspheres include paraffinic hydrocarbons.

In a preferred embodiment of the interactive thermal insulating system of the present invention especially adapted for use in cold weather clothing, the coated first layer constitutes the lining of the clothing, with the uncoated said of the first layer adjacent the body of the wearer. The outer layer constitutes the outer shell of the clothing. The phase change material encapsulated in the microspheres of the coated lining have an average melting temperature which is slightly higher than the average skin temperature, i.e., in the range of 92° F. to 96° F., with 92° F. to 94° F. a preferred range, and 90° F. to 98° F. an acceptable range. A most preferred average crystallization temperature of this phase change material is at most 86° F., with 84° F. to 88° F. a preferred range, and 80° F. to 89° F. an acceptable range. Preferably, for cold weather clothing applications, the average melting temperature of the phase change material encapsulated in microspheres which are dispersed in the fibrous second layer is less than the average melting temperature of phase change material in the coating layer. The preferred average melting temperature of the phase change material contained in microcapsules in the fibers of the second layer is 84° F. to 88° F., with a preferred crystallization temperatures for this material in the range of 76° F. to 84° F.

BRIEF DESCRIPTION OF THE DRAWINGS

FIG. 1 is an exploded isometric view illustrating the layers of a conventional fabric configuration from which cold weather clothing may be manufactured.

FIG. 2 is an exploded isometric view illustrating the first coated layer, the second fibrous layer, and a third covering layer of a thermal regulating system of the present invention.

FIG. 3 is an enlarged detail view of the first and second layers of the thermal regulating system shown in FIG. 2.

FIG. 4 is an enlarged detail end view of a fiber of the second layer shown in FIG. 3.

DETAILED DESCRIPTION OF THE INVENTION

In accordance with the present application, and with reference to FIGS. 2 and 3, an interactive thermal insulating system 20 of the present invention includes a first layer 21, a second layer 22 and a third layer 23. First layer 21 is a flexible substrate 31 treated with a coating 32 in which are dispersed 30 microspheres 33 containing a phase change material 34. Second layer 22 is a fibrous mat of fibers 42 in which are dispersed microspheres 43 containing a phase change material 44. Third layer 23 is a flexible substrate. First, second and third layers 21, 22 and 23 are fastened together by stitching at regularly spaced intervals.

In a preferred embodiment of the interactive thermal insulating system of the present invention especially adapted for use in cold weather clothing, coated first layer 21 constitutes the lining of the clothing. First layer 21 is preferably a nylon taffeta approximately 0.1 millimeter (mm) in thickness, which is coated with a polyurethane coating 32 approximately 0.1 mm in thickness which contains 2 ounces (oz) per square meter ($m^2$) of 10 micron non-ballooning microspheres 33, resulting in a fabric density of approximately 160 grams (g) per $m^2$. The preferred phase change material 34 includes paraffinic hydrocarbons having an average melting temperature of 93° F. Second layer 22 is preferably a batting of acrylic fibers approximately 12 mm thick, of which approximately 10% of the total weight is non-ballooning microspheres containing paraffinic hydrocarbons having an average melting temperature of 86° F. Second layer 22 has an overall density of approximately 140 g/$m^2$. Third layer 23 is a 0.2 mm thick nylon woven shell material having an average density of 140 g/$m^2$. The average weight of the interactive thermal insulating system 20 of the present invention is approximately 440 g/$m^2$.

The degree of thermal assistance providing interactive insulative assistance of each of the first, second and third layers 21, 22 and 23 and of the multi-layer system 20 was tested to determine the basic thermal insulation effect (BTR) of the textile substrate and the dynamic insulation effect (DTR) by the phase change material. For each layer 21, 22 and 23 and for the system 20, the total thermal regulating effect (TTR) was obtained by summing BTR+DTR. Testing was conducted by measuring both insulations effects in separate steps. First, basic thermal insulation of the substrate was tested with a transient thermal measuring technique. Second, the dynamic thermal insulation effect of the phase change material was measured by a technique in which heat emission is translated into insulation terms. Data obtained thereby measured are given in thermal resistance values in the units clo and $m^2*K/W$, whereby 1 clo=0.155 $m^2*K/W$ and 1 $m^2*K/W$=6.45 clo. Data resulting from the tests is summarized in TABLE II.

TABLE II

|  | 1st Layer 21 | 2nd Layer 22 | 3rd Layer 23 | System 20 |
| --- | --- | --- | --- | --- |
| Thickness | 0.2 mm | 12 mm | 0.2 mm | 12.4 mm |
| Density | 160 g/m$^2$ | 140 g/m$^2$ | 140 g/m$^2$ | 440 g/m$^2$ |
| BTR | 0.011 clo | 1.075 clo | 0.019 clo | 1.105 clo |
| DTR | 0.003 clo | 0.795 clo | — | 1.354 clo |
| TTR | 0.014 clo | 1.870 clo | 0.019 clo | 2.459 clo |

The dynamic thermal resistance (DTR) of the system 20 at 1.354 do was significantly greater than a total of the individual DTR values of each of individual layer 21, 22 and 23, which, if added together, would have resulted in a total DTR of 0.798 (0.795+0.003). The magnitude of the improvement in DTR of the system 20 over the total of individual DTRs for the layers 21, 22 and 23 was unexpected.

In comparison, an exemplary conventional fabric systems 10 used in cold weather jackets, was similarly tested. Data resulting from these tests is summarized in TABLE III.

TABLE III

|  | 1st Layer 11 | 2nd Layer 12 | 3rd Layer 14 | System 10 |
| --- | --- | --- | --- | --- |
| Thickness | 0.2 mm | 24 mm | 0.2 mm | 24.4 mm |
| Density | 80 g/m$^2$ | 220 g/m$^2$ | 140 g/m$^2$ | 440 g/m$^2$ |
| BTR | 0.020 clo | 1.323 clo | 0.015 clo | 1.362 clo |
| DTR | — | — | — | — |
| TTR | 0.020 clo | 1.323 clo | 0.015 clo | 1.362 clo |

The thermal insulation effect of fabric system 10 is based only on the basic thermal insulation effect of the substrate, because no phase change material was included in the system. However, it should be noted that despite the fact that the thickness of interactive thermal insulating system 20 of the present invention was approximately ½ of the thickness of the fabric system 10, the total insulation effect was nearly twice as much.

With regard to the preferred embodiments of interactive thermal insulating system 20 of the present invention for use in cold weather clothing, it is most preferred that the average melting temperature of phase change material 34 encapsulated in microspheres 33 be at or slightly higher than the average skin temperature, i.e., in the range of 92° F. to 94° F., with 92° F. to 96° F. a preferred range, and 90° F. to 98° F. an acceptable range. A most preferred average crystallization/freezing temperature of phase change material 34 is at most 86° F., with 84° F. to 88° F. a preferred range, and 80° F. to 89° F. an acceptable range. Preferably, for cold weather clothing applications, the average melting temperature of phase change material 44 encapsulated in microspheres 43 is less than the average melting temperature of phase change material 34. A preferable range of average melting temperature of phase change material 44 is 84° F. to 88° F., with a preferred crystallization temperatures for this material in the range of 76° F. to 84° F. It can appreciated that by selecting two different phase change materials with different melting and freezing ranges as described above, the high density layer supports heat absorption and the low density of the batting supports heat emission.

In the cold temperature clothing configuration described above, the wearer's body functions as a heat source, creating a microclimate in the area adjacent the closest layer of clothing to the skin. High density coated layer 21 acts as a heat pump, efficiently receiving and conducting heat to lower density batting layer 22. High density coated layer 21 thereby acts quickly to stabilize the microclimate next to the wearers skin. Lower density batting layer 22 functions like a heat sink or thermal storage system, absorbing energy to melt phase change material 44. System 20 is responsive to bursts of activity in which the wearer's metabolic rate may increase dramatically. In this way, an interactive insulative capability is achieved with the present invention, and the skin temperature of a person wearing cold weather clothing incorporating system 20 is stabilized in a highly improved manner.

It should be understood that the lower density second layer 22 has been described above in connection with a fibrous batting in which microencapsulated PCMs are dispersed in the fibers. However, alternative configurations of low density materials containing microencapsulated PCMs are also contemplated. For example, second layer 22 may be a foam in which microencapsulated PCMs are dispersed throughout.

As can now be readily appreciated, when the interactive thermal insulating system of the present invention is incorporated in clothing, such clothing may be comfortably worn for longer wearing times. In particular, an improved thermal regulating clothing system is provided which especially adapted for use in cold temperature environments. Thickness of cold weather clothing is reduced, thereby allowing for enhanced freedom of movement of a wearer in cold temperature environments. Conventional clothing patterns and styles may be used with the new fabric configurations of the present invention.

Presently preferred embodiments of the present invention and many of its improvements have been described with a degree of particularity. It should be understood that this description has been made by way of preferred examples, and that the invention is defined by the scope of the following claims.

What is claimed is:

1. A thermal insulating article comprising:
 a first layer coated with a dispersion of a first plurality of microspheres containing a phase change material;
 a second layer positioned adjacent to said first layer, comprising a fabric of fibers, said fibers having a second plurality of microspheres containing a phase change material dispersed therein;
 a flexible third layer positioned adjacent to said second layer; and
 means for maintaining said second layer adjacent said first and third layers.

2. The article of claim 1 wherein said phase change material contained in said first and second plurality of microspheres comprises paraffinic hydrocarbons.

3. The article of claim 2 wherein said first layer has an average density, said second layer has an average density, and said first layer density is greater than said second layer density.

4. The article of claim 1 wherein said first layer further includes a coated surface and an opposing uncoated surface, with said coated surface adjacent said second layer.

5. The article of claim 4 wherein said first layer has an average density, said second layer has an average density, and said first layer density is greater than said second layer density.

6. The article of claim 4 wherein said first plurality of microspheres contain paraffinic hydrocarbons having an average melting point which is between 90° F. and 98° F.; said second plurality of microspheres contain paraffinic hydrocarbons having an average melting point which is less than the average melting point of the first plurality of microspheres, and the article is specially adapted for use in clothing to be worn by a person, with said substrate of said first layer a flexible fabric, said first layer adapted to be positioned close to the person's skin and said third layer adapted to be positioned farther away from the person's skin than said first and second layers.

7. The article of claim 6 wherein said first layer has an average density, said second layer has an average density, and said first layer density is greater than said second layer density.

8. The article of claim 6 wherein said average melting point of said first plurality of microspheres is between 92° F. and 96° F.

9. The article of claim 8 wherein said first layer has an average density, said second layer has an average density, and said first layer density is greater than said second layer density.

10. The article of claim 6 wherein said first plurality of microspheres contain paraffinic hydrocarbons having an average crystallization point of from 84° F. to 88° F.

11. The article of claim 6 wherein said first plurality of microspheres contain paraffinic hydrocarbons having an average crystallization point of from 80° F. to 89° F.

12. The article of claim 1 wherein said average melting point of said first plurality of microspheres is between 92° F. and 94° F.

13. The article of claim 12 wherein said first layer has an average density, said second layer has an average density, and said first layer density is greater than said second layer density.

14. The article of claim 1 wherein said first plurality of microspheres contain paraffinic hydrocarbons having an average crystallization point which is approximately 86° F. and said second plurality of microspheres contain paraffinic hydrocarbons having an average crystallization point which is below said average crystallization point of said paraffinic hydrocarbons of said first plurality of microspheres.

15. The article of claim 1 wherein said first layer has an average density, said second layer has an average density, and said first layer density is greater than said second layer density.

* * * * *